US012010778B2

(12) United States Patent
Mack

(10) Patent No.: US 12,010,778 B2
(45) Date of Patent: Jun. 11, 2024

(54) POWER MANAGEMENT CONTROL DEVICE

(71) Applicant: Tim Mack, Louisville, KY (US)

(72) Inventor: Tim Mack, Louisville, KY (US)

( * ) Notice: Subject to any disclaimer, the term of this patent is extended or adjusted under 35 U.S.C. 154(b) by 50 days.

(21) Appl. No.: 17/946,118

(22) Filed: Sep. 16, 2022

(65) Prior Publication Data

US 2024/0098862 A1 Mar. 21, 2024

(51) Int. Cl.
*H05B 47/13* (2020.01)

(52) U.S. Cl.
CPC .................................... *H05B 47/13* (2020.01)

(58) Field of Classification Search
None
See application file for complete search history.

(56) References Cited

U.S. PATENT DOCUMENTS

| | | | | | |
|---|---|---|---|---|---|
| 4,636,774 | A | | 1/1987 | Galvin | |
| 5,189,393 | A | | 2/1993 | Hu | |
| 5,394,961 | A | * | 3/1995 | Biver | B66B 13/26 49/118 |
| 5,586,048 | A | * | 12/1996 | Coveley | G08B 13/19 340/552 |
| 5,726,269 | A | | 3/1998 | Yu | |
| 7,405,524 | B2 | | 7/2008 | Null | |
| 2012/0248315 | A1 | * | 10/2012 | Kim | G01V 8/20 250/349 |

FOREIGN PATENT DOCUMENTS

| | | |
|---|---|---|
| CA | 2387100 | 11/2003 |

* cited by examiner

*Primary Examiner* — Thomas S McCormack

(57) ABSTRACT

A power management control device for selectively powering an electrical device based on room occupancy includes a controller and a sensor module, which are mountable to a substrate proximate to a doorway and to a doorframe defining the doorway, respectively. The controller is operationally engageable to an electrical circuit of a structure so that the controller is operationally engaged to an electrically powered device in a room of the structure to which the doorway allows entry. The controller can selectively actuate the electrically powered device. The sensor module is operationally engaged to the controller and detects passage of persons through the doorway and signals the controller. The controller maintains a count of persons in the room, actuates the electrically powered device upon entry of a first person into the room, and deactuates the electrically powered device upon exit of a last person from the room.

7 Claims, 4 Drawing Sheets

POWER MANAGEMENT CONTROL DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to control devices and more particularly pertains to a new control device for selectively powering an electrical device based on room occupancy. The present invention discloses a control device that tracks occupancy of a room and selectively powers electronic devices based on room occupancy.

(2) Description of Related Art Including Information Disclosed Under 37 CFR 1.97 and 1.98

The prior art relates to control devices, which may comprise control devices that power on lights for a set period of time upon entry of a person into a room. What is lacking in the prior art is a control device comprising a sensor module, which detects passage of persons through a doorway and signals a controller. The controller maintains a count of persons in the room, actuates an electrically powered device in a room upon entry of a first person into the room, and deactuates the electrically powered device upon exit of a last person from the room.

BRIEF SUMMARY OF THE INVENTION

An embodiment of the disclosure meets the needs presented above by generally comprising a controller and a sensor module, which are configured to be mountable to a substrate proximate to a doorway and to a doorframe defining the doorway, respectively. The controller is configured to operationally engage an electrical circuit of a structure so that the controller is operationally engaged to at least one electrically powered device in at least one room of the structure to which the doorway allows entry. The controller thus is configured to selectively actuate the at least one electrically powered device. The sensor module is operationally engaged to the controller and is configured to detect passage of persons through the doorway and to signal the controller. The controller is enabled to maintain a count of persons in the at least one room, to actuate the at least one electrically powered device upon entry of a first person into the at least one room, and to deactuate the at least one electrically powered device upon exit of a last person from the at least one room.

Another embodiment of the disclosure comprises a power management control system, which includes a structure having a doorway defined by a doorframe. The doorway allows entry into at least one room of the structure. At least one electrically powered device is in the at least one room and is engaged to an electrical circuit of a structure. A controller is mounted to a substrate proximate to the doorway and is operationally engaged to the at least one electrically powered device. A sensor module is mounted to the doorframe and is operationally engaged to the sensor module. The sensor module is configured to detect passage of persons through the doorway and to signal the controller. The controller is enabled to maintain a count of persons in the at least one room, to actuate the at least one electrically powered device upon entry of a first person into the at least one room, and to deactuate the at least one electrically powered device upon exit of a last person from the at least one room.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
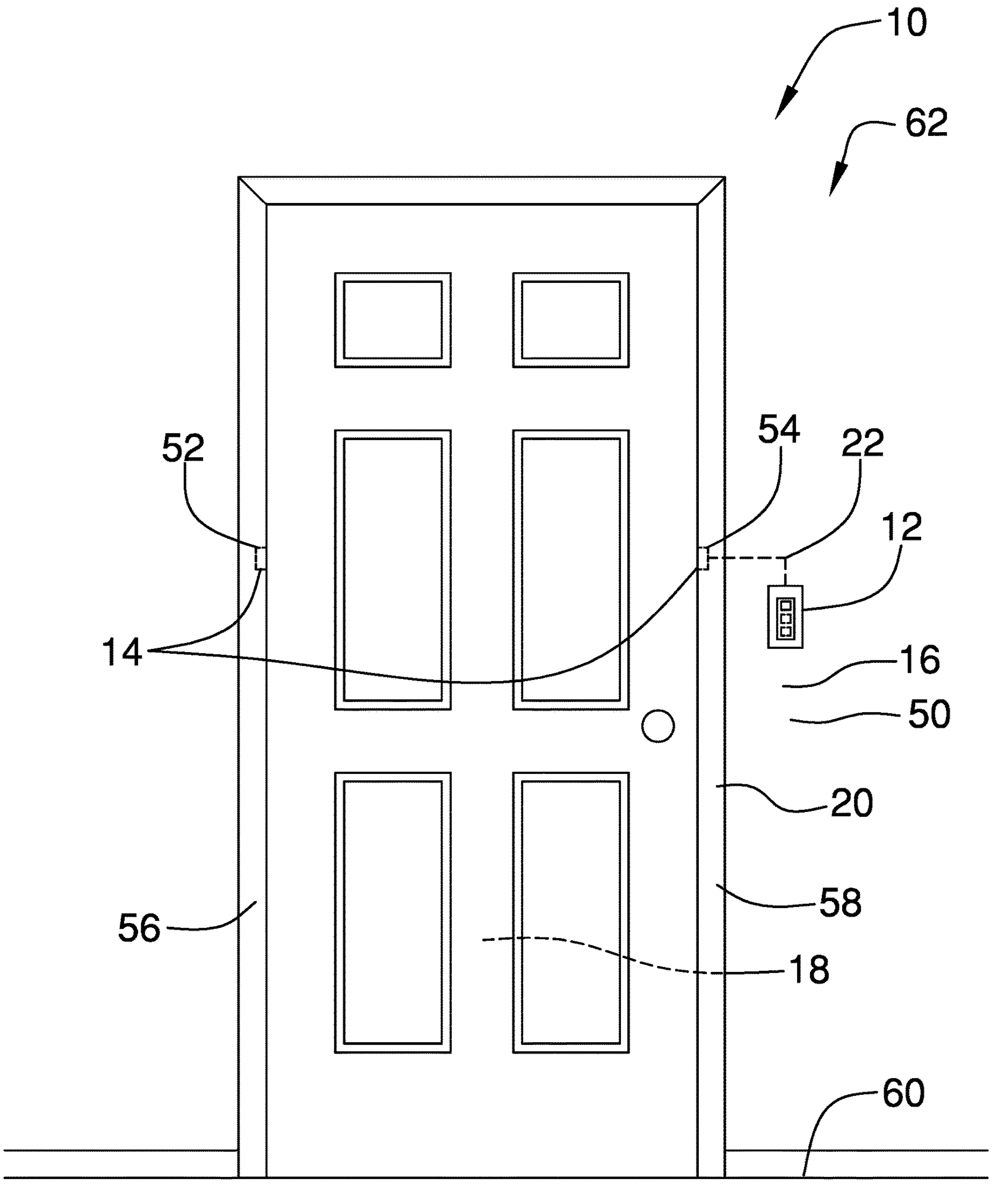
FIG. 1 is a front view of a power management control device according to an embodiment of the disclosure.

With reference now to the drawings, and in particular to FIGS. 1 through 6 thereof, a new control device embodying the principles and concepts of an embodiment of the disclosure and generally designated by the reference numeral 10 will be described.

Figure 6:
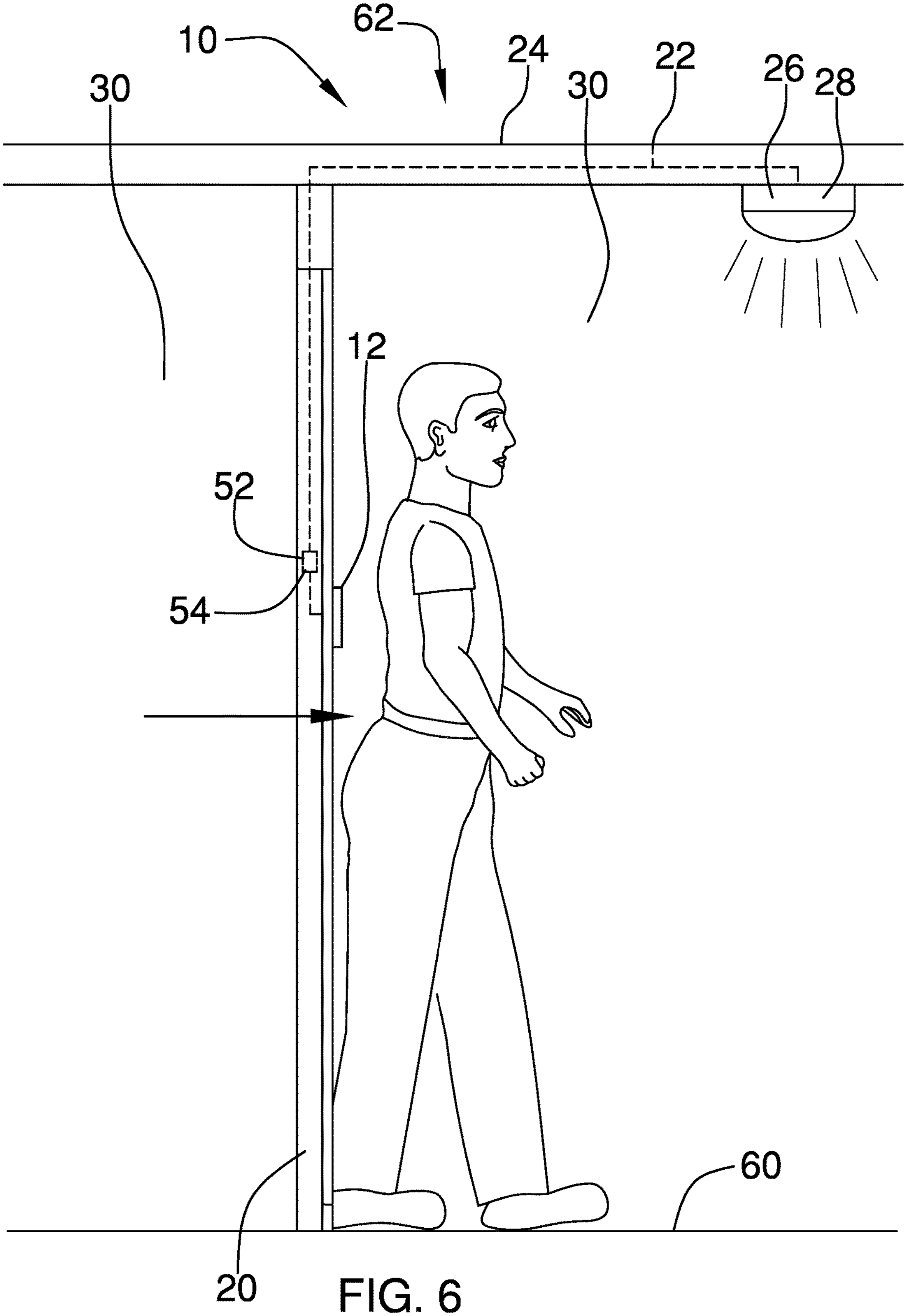
FIG. 6 is an in-use view of an embodiment of the disclosure.

As best illustrated in FIGS. 1 through 6, the power management control device generally comprises a controller 12 and a sensor module 14, which are configured to be mountable to a substrate 16 proximate to a doorway 18 and to a doorframe 20 defining the doorway 18, respectively. The controller 12 is configured to operationally engage an electrical circuit 22 of a structure 24 so that the controller 12 is operationally engaged to at least one electrically powered device 26, such as a light 28, as shown in FIG. 6, a fan, an air conditioning unit, or the like, in at least one room 30 of the structure 24 to which the doorway 18 allows entry. The controller 12 thus is configured to selectively actuate the at least one electrically powered device 26.

Types of structures 24 anticipated include, but are not limited to, houses, offices, schools, and the like. The at least one room 30 may comprise, for example, a bedroom and a bathroom. The controller 12 thus would be configured to turn off at least one electrically powered device 26 in the bedroom and to turn on one electrically powered device 26 in the bathroom as a person traverses from the bedroom to the bathroom.

Figure 2:
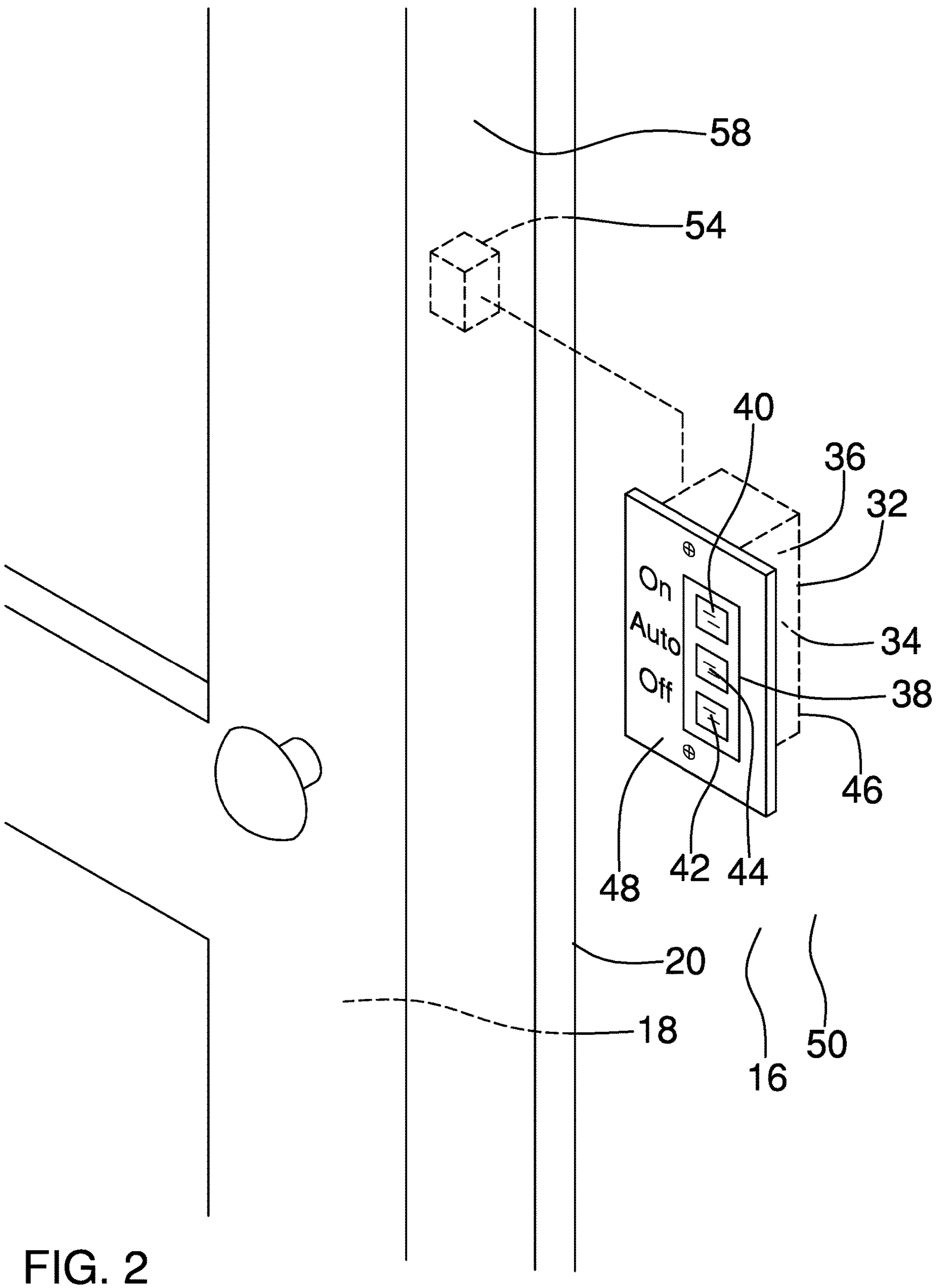
FIG. 2 is a detail view of an embodiment of the disclosure.
Figure 3:
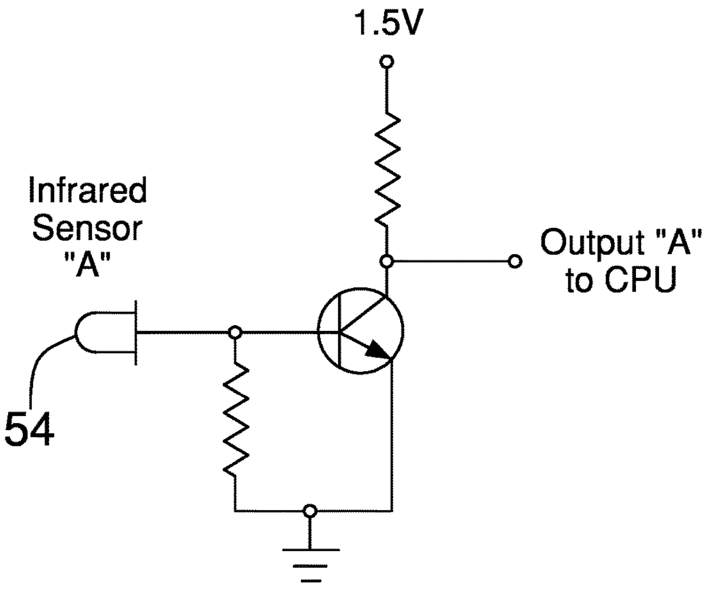
FIG. 3 is a circuit diagram of an embodiment of the disclosure.
Figure 4:
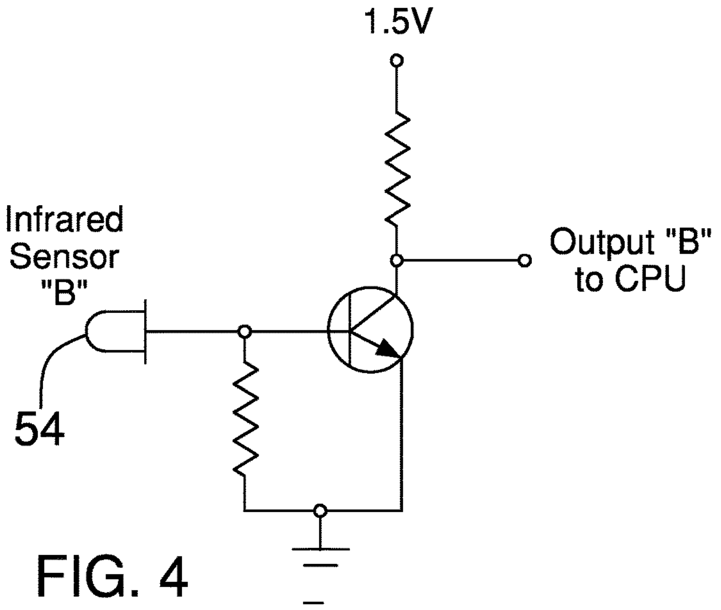
FIG. 4 is a circuit diagram of an embodiment of the disclosure.
Figure 5:
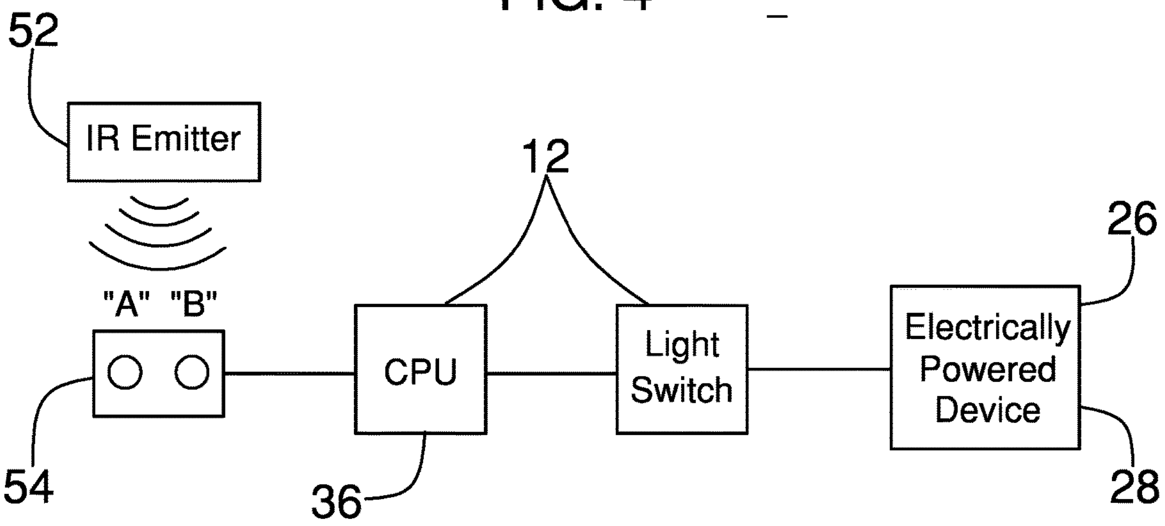
FIG. 5 is a block diagram of an embodiment of the disclosure.

The controller 12 comprises a housing 32, which defines an interior space 34. A microprocessor 36 is attached to the housing 32 and is positioned in the interior space 34. A control panel 38 is attached to the housing 32 and is operationally engaged to the microprocessor 36. The control panel 38 is configured to be manipulated by a user to input commands into the microprocessor 36. In one configuration, the control panel 38 comprises a first switch 40, a second switch 42, and a third switch 44. The first switch 40 is configured to be switched to turn on the at least one electrically powered device 26. The second switch 42 is configured to be switched to turn off the at least one electrically powered device 26. The second switch 42 might be used, for example, in a media room, a bedroom, or the like, in which lighting might be turned off while the room 30 is occupied. The third switch 44 is configured to be switched to enable the microprocessor 36 to selectively actuate the at least one electrically powered device 26. The first switch 40, the second switch 42, and the third switch 44 may comprise toggle switches, depressible buttons, touch activated switches, or the like. The first switch 40 also may be configured to dim the light 28. As shown in FIG. 2, the controller 12 comprises a switchbox 46 and a faceplate 48, which are mountable to a wall 50 of the structure 24 by means known to those skilled in the art of installing switchboxes.

The sensor module 14 is operationally engaged to the controller 12 and is configured to detect passage of persons through the doorway 18 and to signal the controller 12. The controller 12 is enabled to maintain a count of persons in the at least one room 30, to actuate the at least one electrically powered device 26 upon entry of a first person into the at least one room 30, and to deactuate the at least one electrically powered device 26 upon exit of a last person from the at least one room 30.

In the example above, wherein the at least one room 30 comprises a bedroom and a bathroom, each of the bedroom and the bathroom may have a controller 12 that is operationally engaged to the sensor module 14. A user thus can selectively actuate or deactuate the at least one electrically powered device 26 in the bedroom and the at least one electrically powered device 26 in the bathroom.

The sensor module 14 may comprise at least one infrared emitter 52 and at least two infrared detectors 54, which are configured to be mountable to a first jamb 56 and to a second jamb 58 of the doorframe 20, respectively. The infrared detectors 54 are positioned to detect infrared light emitted by the at least one infrared emitter 52. The infrared detectors 54 are substantially linearly positioned perpendicularly to the doorway 18 so that the infrared light to the infrared detectors 54 is interrupted sequentially as a person passes through the doorway 18. The controller 12 thus is enabled to determine whether the person is entering or exiting the at least one room 30. The sensor module 14 may comprise other means to detect passage of persons through the doorway 18, such as, but not limited to, proximity sensors, cameras, and the like.

As shown in FIG. 1, the sensor module 14 is positioned approximately 1.22 m above a floor 60 of the structure 24. The present invention anticipates the sensor module 14 being positioned at other heights relative to the floor 60. For example, positioning the sensor module 14 at a lower height would enable it to detect passage of children and wheelchairs through the doorway 18.

The present invention also anticipates a power management control system 62, which comprises a structure 24 having a doorway 18 defined by a doorframe 20. The doorway 18 allows entry into at least one room 30 of the structure 24. At least one electrically powered device 26 is in the at least one room 30 and is engaged to an electrical circuit 22 of the structure 24. A controller 12 is mounted to a substrate 16 proximate to the doorway 18 and is operationally engaged to the at least one electrically powered device 26. A sensor module 14 is mounted to the doorframe 20 and is operationally engaged to the sensor module 14. The sensor module 14 is configured to detect passage of persons through the doorway 18 and to signal the controller 12. The controller 12 is enabled to maintain a count of persons in the at least one room 30, to actuate the at least one electrically powered device 26 upon entry of a first person into the at least one room 30, and to deactuate the at least one electrically powered device 26 upon exit of a last person from the at least one room 30.

In use, the controller 12 and the sensor module 14 are mounted to the substrate 16 and to the doorframe 20, respectively. The controller 12 is operationally engaged to the electrical circuit 22 of and thus to the electrically powered device 26 in the room 30. The sensor module 14 detects passage of persons through the doorway 18 and signals the controller 12. The controller 12 maintains the count of persons in the room 30, actuates the electrically powered device 26 upon entry of the first person into the room 30, and deactuates the electrically powered device 26 upon exit of the last person from the room 30.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word “comprising” is used in its non-limiting sense to mean that items following the word are included, but items not specifically mentioned are not excluded. A reference to an element by the indefinite article “a” does not exclude the possibility that more than one of the element is present, unless the context clearly requires that there be only one of the elements.

I claim:

1. A power management control device comprising:
- a controller configured to be mountable to a substrate proximate to a doorway, the controller being configured to operationally engage an electrical circuit of a structure, such that the controller is operationally engaged to at least one electrically powered device in at least one room of the structure to which the doorway allows entry, wherein the controller is configured for selectively actuating the at least one electrically powered device; and
- a sensor module configured to be mountable to a doorframe defining the doorway, the sensor module being operationally engaged to the controller and configured for detecting passage of a person through the doorway, wherein the sensor module is configured for detecting passage of persons through the doorway and for signaling the controller, such that the controller is enabled for maintaining a count of persons in the at least one room, enabling the controller for actuating the at least one electrically powered device upon entry of a first person into the at least one room and for deactuating the at least one electrically powered device upon exit of a last person from the at least one room, the sensor module comprising:
  - at least one infrared emitter configured to be mountable to a first jamb of the doorframe; and
  - at least two infrared detectors configured to be mountable to a second jamb of the doorframe, such that the infrared detectors are positioned for detecting infrared light emitted by the at least one infrared emitter, the infrared detectors being substantially linearly spaced from each other in a direction parallel to a path which extends through the doorway, such that the infrared light to the infrared detectors is interrupted sequentially as a person passes through the doorway, such that the controller is enabled for sensing and differentiating between the person entering the at least one room and exiting the at least one room.

2. The power management control device of claim 1, wherein the controller comprises:
- a housing defining an interior space;
- a microprocessor attached to the housing and positioned in the interior space; and
- a control panel attached to the housing and operationally engaged to the microprocessor, wherein the control panel is configured for manipulation by a user for inputting commands into the microprocessor.

3. The power management control device of claim 2, wherein the control panel comprises:
- a first switch configured for being switched for turning on the at least one electrically powered device;
- a second switch configured for being switched for turning off the at least one electrically powered device; and
- a third switch configured for being switched for enabling the microprocessor for selectively actuating the at least one electrically powered device.

4. A power management control device comprising:
- a controller configured to be mountable to a substrate proximate to a doorway, the controller being configured to operationally engage an electrical circuit of a structure, such that the controller is operationally engaged to at least one electrically powered device in at least one room of the structure to which the doorway allows entry, wherein the controller is configured for selectively actuating the at least one electrically powered device, the controller comprising:
  - a housing defining an interior space,
  - a microprocessor attached to the housing and positioned in the interior space, and
  - a control panel attached to the housing and operationally engaged to the microprocessor, wherein the control panel is configured for manipulation by a user for inputting commands into the microprocessor, the control panel comprising:
    - a first switch configured for being switched for turning on the at least one electrically powered device,
    - a second switch configured for being switched for turning off the at least one electrically powered device, and
    - a third switch configured for being switched for enabling the microprocessor for selectively actuating the at least one electrically powered device; and
- a sensor module configured to be mountable to a doorframe defining the doorway, the sensor module being operationally engaged to the controller and configured for detecting passage of a person through the doorway, wherein the sensor module is configured for detecting passage of persons through the doorway and for signaling the controller, such that the controller is enabled for maintaining a count of persons in the at least one room, enabling the controller for actuating the at least one electrically powered device upon entry of a first person into the at least one room and for deactuating the at least one electrically powered device upon exit of a last person from the at least one room, the sensor module comprising:
  - at least one infrared emitter configured to be mountable to a first jamb of the doorframe, and
  - at least two infrared detectors configured to be mountable to a second jamb of the doorframe, such that the infrared detectors are positioned for detecting infrared light emitted by the at least one infrared emitter, the infrared detectors being substantially linearly spaced from each other in a direction parallel to a path which extends through the doorway, such that the infrared light to the infrared detectors is interrupted sequentially as a person passes through the doorway, such that the controller is enabled for sensing and differentiating between the person entering the at least one room and exiting the at least one room.

5. A power management control system comprising:
- a structure having a doorway defined by a doorframe, the doorway allowing entry into at least one room of the structure;
- at least one electrically powered device in the at least one room and being engaged to an electrical circuit of a structure;
- a controller mounted to a substrate proximate to the doorway and operationally engaged to the at least one electrically powered device; and a sensor module mounted to the doorframe and operationally engaged to the controller, wherein the sensor module is configured for detecting passage of persons through the doorway and for signaling the controller, such that the controller is enabled for maintaining a count of persons in the at least one room, enabling the controller for actuating the at least one electrically powered device upon entry of a first person into the at least one room and for deactuating the at least one electrically powered device upon exit of a last person from the at least one room, the sensor module comprising:

at least one infrared emitter mounted to a first jamb of the doorframe; and at least two infrared detectors mounted to a second jamb of the doorframe, such that the infrared detectors are positioned for detecting infrared light emitted by the at least one infrared emitter, the infrared detectors being substantially linearly spaced from each other in a direction parallel to a path which extends through the doorway, such that the infrared light to the infrared detectors is interrupted sequentially as a person passes through the doorway, such that the controller is enabled for sensing and differentiating between the person entering the at least one room and exiting the at least one room.

6. The power management control system of claim 5, wherein the controller comprises:

a housing defining an interior space;

a microprocessor attached to the housing and positioned in the interior space; and a control panel attached to the housing and operationally engaged to the microprocessor, wherein the control panel is configured for manipulation by a user for inputting commands into the microprocessor.

7. The power management control system of claim 6, wherein the control panel comprises:

a first switch configured for being switched for turning on the at least one electrically powered device;

a second switch configured for being switched for turning off the at least one electrically powered device; and a third switch configured for being switched for enabling the microprocessor for selectively actuating the at least one electrically powered device.

* * * * *